US012784527B2

(12) United States Patent
MacInnes et al.

(10) Patent No.: US 12,784,527 B2
(45) Date of Patent: Nov. 3, 2026

(54) MEDIA SHUTTER ATTACK SENSING

(71) Applicant: NCR Atleos Corporation, Atlanta, GA (US)

(72) Inventors: Donald Iain MacInnes, Monifieth (GB); Gordon Hanna, Perth (GB); Ryan Plomer, Arbroath (GB); Maxwell Alfred Wiewiorka, Invergowrie (GB)

(73) Assignee: NCR Atleos Corporation, Atlanta, GA (US)

( * ) Notice: Subject to any disclaimer, the term of this patent is extended or adjusted under 35 U.S.C. 154(b) by 602 days.

(21) Appl. No.: 18/373,496

(22) Filed: Sep. 27, 2023

(65) Prior Publication Data

US 2025/0104501 A1 Mar. 27, 2025

(51) Int. Cl.

*G07D 11/225* (2019.01)
*G07D 11/14* (2019.01)
*G07D 11/40* (2019.01)

(52) U.S. Cl.

CPC ........... *G07D 11/225* (2019.01); *G07D 11/14* (2019.01); *G07D 11/40* (2019.01); *G07D 2211/00* (2013.01)

(58) Field of Classification Search

CPC ...... G07D 11/225; G07D 11/14; G07D 11/40; G07D 2211/00; G07F 19/207; G07F 19/209; G07F 19/2055
USPC ................ 194/200, 202, 206, 207, 350, 351
See application file for complete search history.

(56) References Cited

U.S. PATENT DOCUMENTS

| | | | | |
|---|---|---|---|---|
| 9,349,259 B1 | 5/2016 | Denny et al. | | |
| 2013/0152475 A1* | 6/2013 | Pang ...................... | G07D 11/14 49/324 | |

FOREIGN PATENT DOCUMENTS

| | | |
|---|---|---|
| GB | 2534832 | 8/2016 |
| JP | H07244765 | 9/1995 |
| JP | H0844935 | 2/1996 |

OTHER PUBLICATIONS www.dictionary.com definition of the term "raise" (Year: 2026).*

* cited by examiner

*Primary Examiner* — Jeffrey A Shapiro
(74) *Attorney, Agent, or Firm* — Schwegman Lundberg & Woessner, P.A.

(57) ABSTRACT

A media shutter apparatus is provided. The apparatus includes a side flange with first and second apertures. The side flange is affixed to an end of a blade/shutter and the first aperture adapted to receive a pin that drives the blade open and shut via movement of the pin through the first aperture. The second aperture is adjacent to the first aperture and adapted to rupture and move the side flange such that the pin is in the second aperture when force is applied to the blade and transferred to the side flange. The side flange further includes an extending notch from a bottom of the side flange that is surrounded by a sensor such that when the notch moves because of a rupture of the pin from the first aperture to the second aperture the sensor reports a change in state for the blade.

10 Claims, 8 Drawing Sheets

MEDIA SHUTTER ATTACK SENSING

BACKGROUND

Media handling devices, such as automated teller machines (ATMs) have a variety of different modules one of which is a shutter module. Often, ATMs stage currency withdrawals behind a shutter of the shutter module until a customer withdraws their bank card used to perform a withdrawal transaction. Once the customer removes their card from a card module of the ATM, the shutter opens, and the currency is dispensed to the customer. When the card is not withdrawn after a configurable period of elapsed time, the ATM assumes the transaction was canceled and moves the staged media back into recycling cassettes of the ATM; the customer's transaction is canceled, and no currency is debited from the card account associated with the transaction.

Recently, thieves have discovered a security hole in the above-discussed process. The shutter is shattered off such that the currency dispense slot is accessible. An anonymously funded debit card is used to initiate a valid withdraw transaction at an ATM. When the currency appears adjacent to the slot, the thieves grab ahold of the currency while at the same time holding on to the debit card such that the card module cannot take the card when the card is not withdrawn within a configurable amount of time. The currency is taken, and the card is taken back by the thieves. The ATM cancels the transaction such that the account associated with the debit card is not debited. The thieves then move on to another ATM using the same scam, a different card, or the same card.

The shutter module includes a sensor to report to the ATM when the shutter is opened and closed. However, the sensor does not activate properly when just the shutter covering is broken off. As a result, once the shutter covering is broken off, the shutter module continues to report incorrect shutter states to the ATM. Thus, thieves are taking advantage of this security hole in ATM technology.

SUMMARY

In various embodiments, an apparatus, a media handling device, a transaction terminal, and a method for sensing shutter attacks are presented. The apparatus includes a side flange used to allow the blade of a shutter assembly to open and close during a transaction at the media handling device. The side flange includes a pair of apertures, a first aperture includes a pin that allows the blade to be opened and closed as the pin moves through the first aperture. The second aperture is adjacent to the first aperture and weakens the side flange such that when force is applied to the blade, the side flange breaks and causes an upward movement in the side flange. The side flange also includes a bottom rectangular notch that protrudes outward from the side flange.

An optical sensor is placed around the notch such that when the blade is broken and the side flange breaks due to a rupture in the second aperture from force exerted on the blade, the optical sensor detects upward movement when the notch of the side flange moves. A not closed signal/state/event is sent to a printed control board (PCB) of the shutter assembly and is relayed from the PCB to a security agent that executes on the media handling device and/or a transaction terminal to indicate that the blade of the shutter assembly is not closed as it should be. The security agent can process a workflow of security operations based on the blade not closed signal, such as shutting down the media handling device for transactions and raising a security notice or a security alert that the media handling device and shutter blade needs manually inspected for the transaction terminal.

DETAILED DESCRIPTION

Thieves have discovered a security hole in media handling devices of transaction terminals as discussed above. Typically, a claw hammer of other hard flat and skinny object is wedged between a bottom of the shutter and the outer housing of the media handling device and/or terminal. The thief then pulls up with the object to snap the shutter. Once the shutter is broken, the thief has access to the staging area of the shutter assembly and can grab ahold of any staged currency made for a currency withdraw transaction.

Figure 1A:
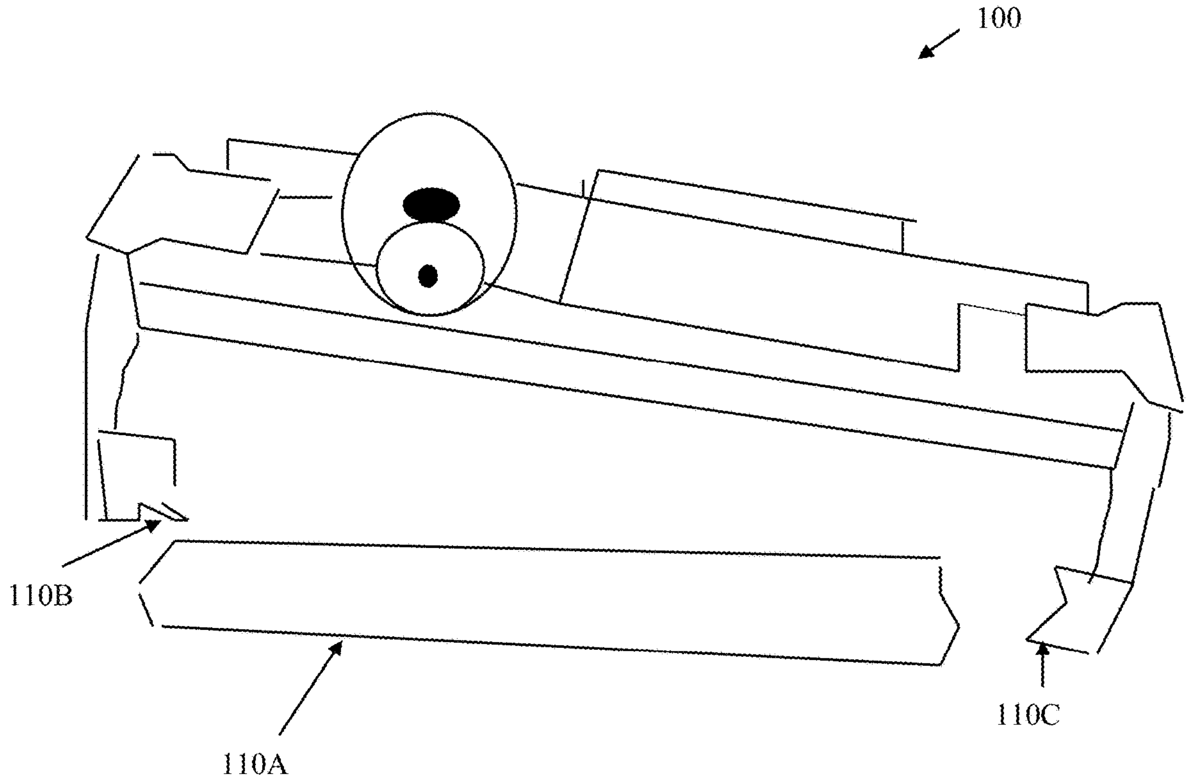
FIG. 1A PRIOR ART
FIG. 1A is a prior art diagram of a conventional shutter assembly with of a broken blade.

FIG. 1A is a prior art diagram of a conventional shutter assembly 100 with a broken blade after a thief has exerted force under the blade 110A. The force causes the blade 110A to snap in three pieces. A first piece 100A detaches away from the other two pieces 110B and 110C, which both remain affixed to side flanges of the conventional shutter assembly 100.

Figure 1B:
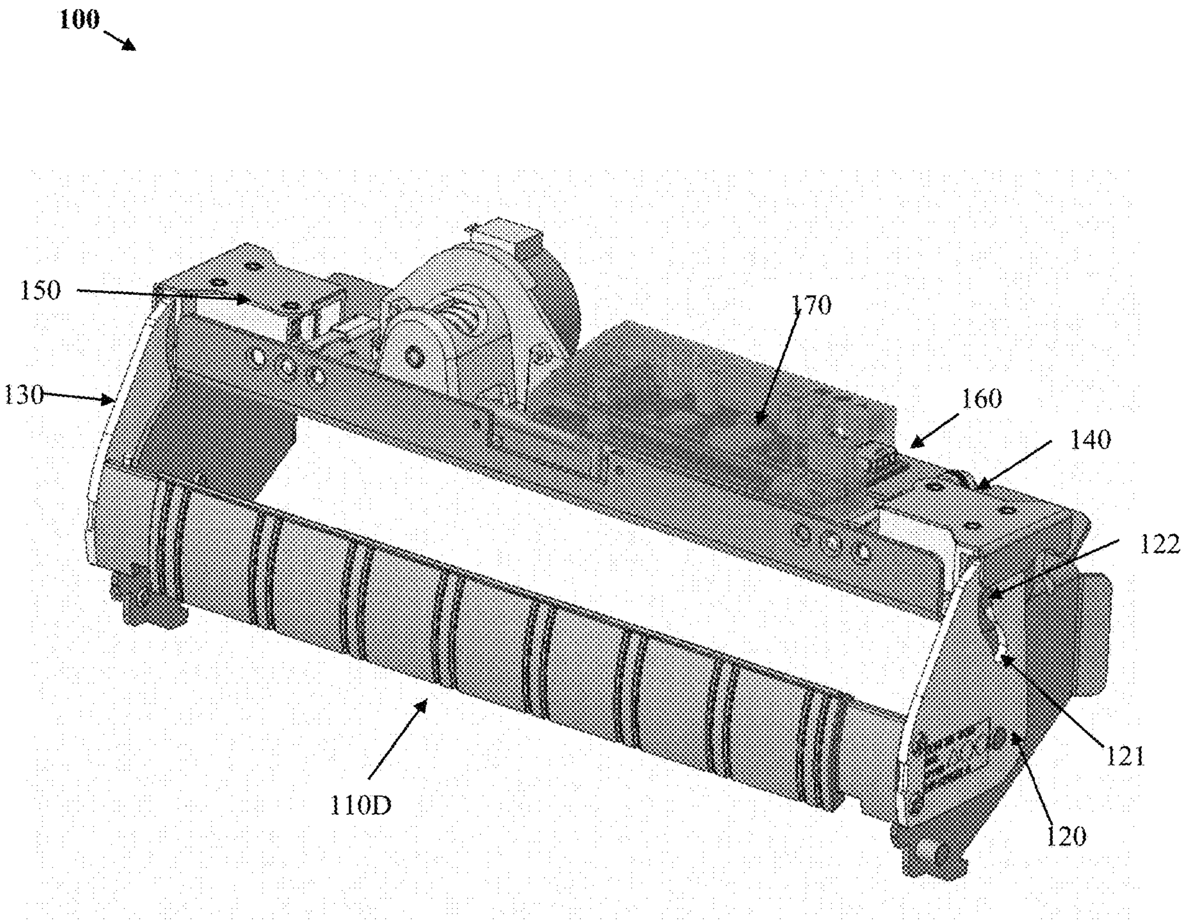
FIG. 1B PRIOR ART
FIG. 1B is a prior art diagram of conventional shutter assembly with an unbroken blade in a blade closed state.

FIG. 1B is a prior art diagram of conventional shutter assembly 100 with an unbroken blade 100D in a blade closed state. The conventional shutter assembly 100 includes a left-side flange 120, a right-side flange 130, a closed blade state sensor 140, an open blade state sensor 150, a senor port 160, and a printed circuit board (PCB) 170. The left-side flange 120 further includes an aperture 121 in an S shape along with a pin 122. Each flange 120 and 130 is also affixed or securely attached to an end of the blade 110D. The closed blade state sensor 140 reports the blade 110D is closed with the pin 122 is at the top of the aperture 121 as illustrated in FIG. 1B. Should the pin 122 travel downward within the aperture 121, side flange 120 raises up lifting the blade 110D and the closed blade state sensor 140 reports that the shutter assembly is in a not-closed state.

The issue with the conventional shutter assembly 100 is that the left-side flange 120 has very little if any movement when the blade 110D is broken, such that pin 122 does not move; the pin is locked and may not move at all even when the blade is broken. As a result, the closed blade state sensor 140 continues to report that the blade 110D is closed when in fact, the blade is broken into three or more pieces 110A, 100B, and 110C as shown in FIG. 1A. Because the media handling device and transaction terminal, which includes the media handling device, expects the blade to be locked and closed, security actions are not processed on the media handling device and transaction terminal never receive notice that the blade 110D was broken from PCB 170. Sensor 140 is connected via a cable to sensor port 160 but the state/event never changes from the blade being closed so the security processes are never notified of a broken blade in the shutter assembly 100.

Figure 1C:
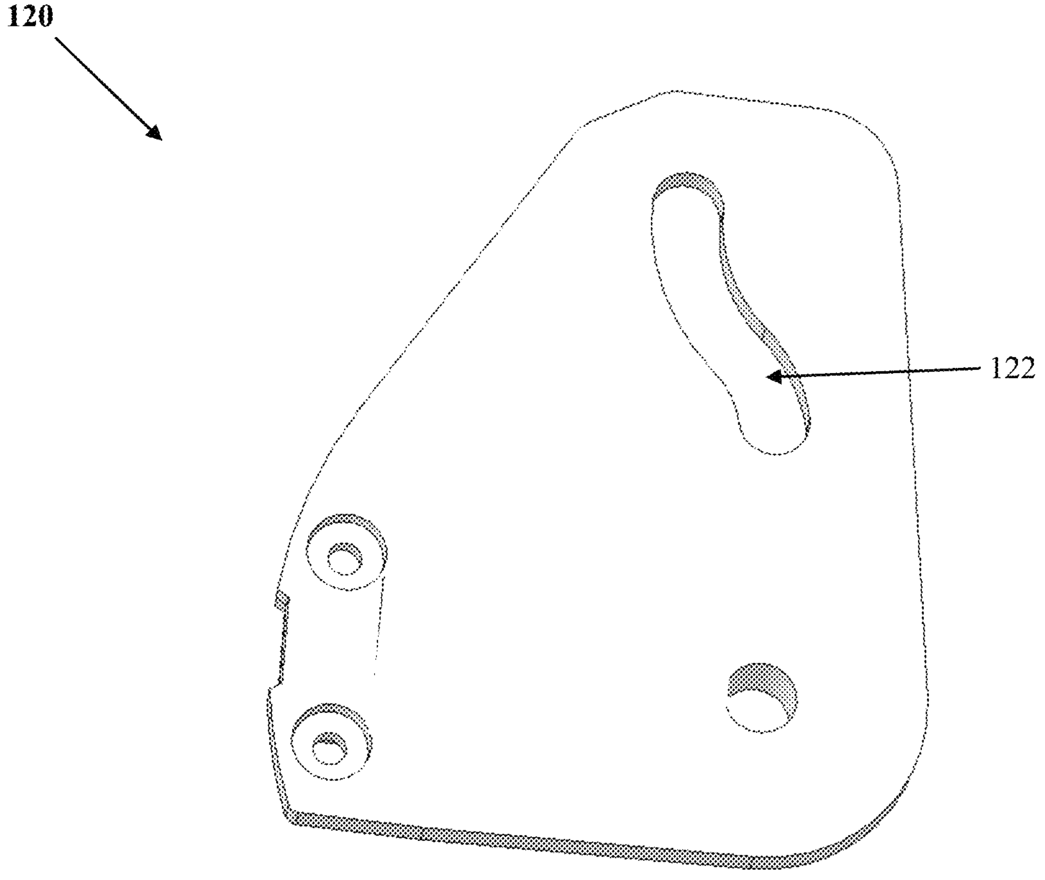
FIG. 1C PRIOR ART
FIG. 1C is a prior art diagram of side flange of a conventional shutter assembly.

FIG. 1C is a prior art diagram of a left-side flange 120 of a conventional shutter assembly 120. Force exerted by a thief under the blade 100D breaks the blade by does not cause the pin 121 or the side flange 120 to move or slide within aperture 122. Consequently, the closed blade state sensor 140 is never tripped or activated.

The security hole associated with breaking the blade of a shutter assembly is solved with the teachings provided herein. The left-side flange of the shutter assembly is modified to include a bottom protruding and extending notch, which is surrounded by a U-shaped optical sensor. Moreover, a second aperture is added adjacent to the S-shaped aperture, which is adapted to house the pin. The shape and location of the second aperture relative to an edge of the left-side flange and relative to the S-shaped aperture weakens the left-side flange, such that when force is applied under the blade, the left-side flange breaks and causes movement in the notch, which the optical sensor reports as a not closed blade state/event. In an embodiment, cabling from the newly added sensor is integrated into the cabling associated with the closed blade state sensor 140 such that when the pin moves, or the notch moves a not-closed state is reported through the closed-state sensor port to a PCB of the shutter assembly.

Experimentation/Simulation was performed along with physical testing to ensure the size, shape, and location of the second aperture did not weaken the shutter assembly for general use or mild attacks, which would not break the blade. Results proved that the size, shape, and location of the second aperture only ruptured into the first aperture when an attack broke the blade.

Thus, no firmware or software changes are needed to existing firmware with the teachings provided herein. In fact, the PCB of the shutter assembly and the sensor ports are unchanged; rather, and in an embodiment, just the left-side flange, the added optical sensor, and the integration of cabling from the new optical sensor to the existing cabling output from the existing closed-state senor are modified to achieve detection of a broken blade in a shutter assembly. When a blade not closed sensor state or signal is received, the existing firmware sends a security alert to downstream software/firmware for security processing or processing of at least one security action or operation.

As used herein, the phrases "shutter assembly," "shutter apparatus," and "shutter module" may be used interchangeably and synonymously. This refers to the electromechanical, hardware, and firmware/software of a shutter system for a media handling device. The shutter system is responsible for accepting and dispensing media, such as currency, for deposits and withdrawals through a slot located behind a shutter or a blade that is opened and closed to receive currency deposits and/or dispense currency.

The terms "media," "media item," "banknotes," "notes," "currency," "checks," and/or "cash" are used synonymously and interchangeably herein and below. These terms refer to the media being transported to, from, and within a deposit and dispense module of a media handling device during a media operation being processed. In an embodiment, the "media operations" include depositing a single note, depositing a bunch of notes, depositing a single check, depositing a bunch of checks, depositing a mixture of notes and checks within a single bunch, dispensing currency, dispensing a bunch of currency, and/or rejecting one or a plurality of media items during a deposit media operation.

In an embodiment, the media handling device is an integrated peripheral device of a transaction terminal. In an embodiment, the transaction terminal is an automated teller machine (ATM). In an embodiment, the transaction terminal is a point-of-sale (POS) terminal operated by a cashier or a teller during a media operation. In an embodiment, the transaction terminal is a self-service terminal (SST) with a consumer performing a self-service media operation; for example, a self-service checkout at a retail or grocery store, a cash withdrawal transaction, etc. The SST includes a deposit and dispense module or media handling device to receive/deposit notes and to dispense notes for purposes of receiving payment and providing change to the consumer for a self-service transaction.

Figure 2A:
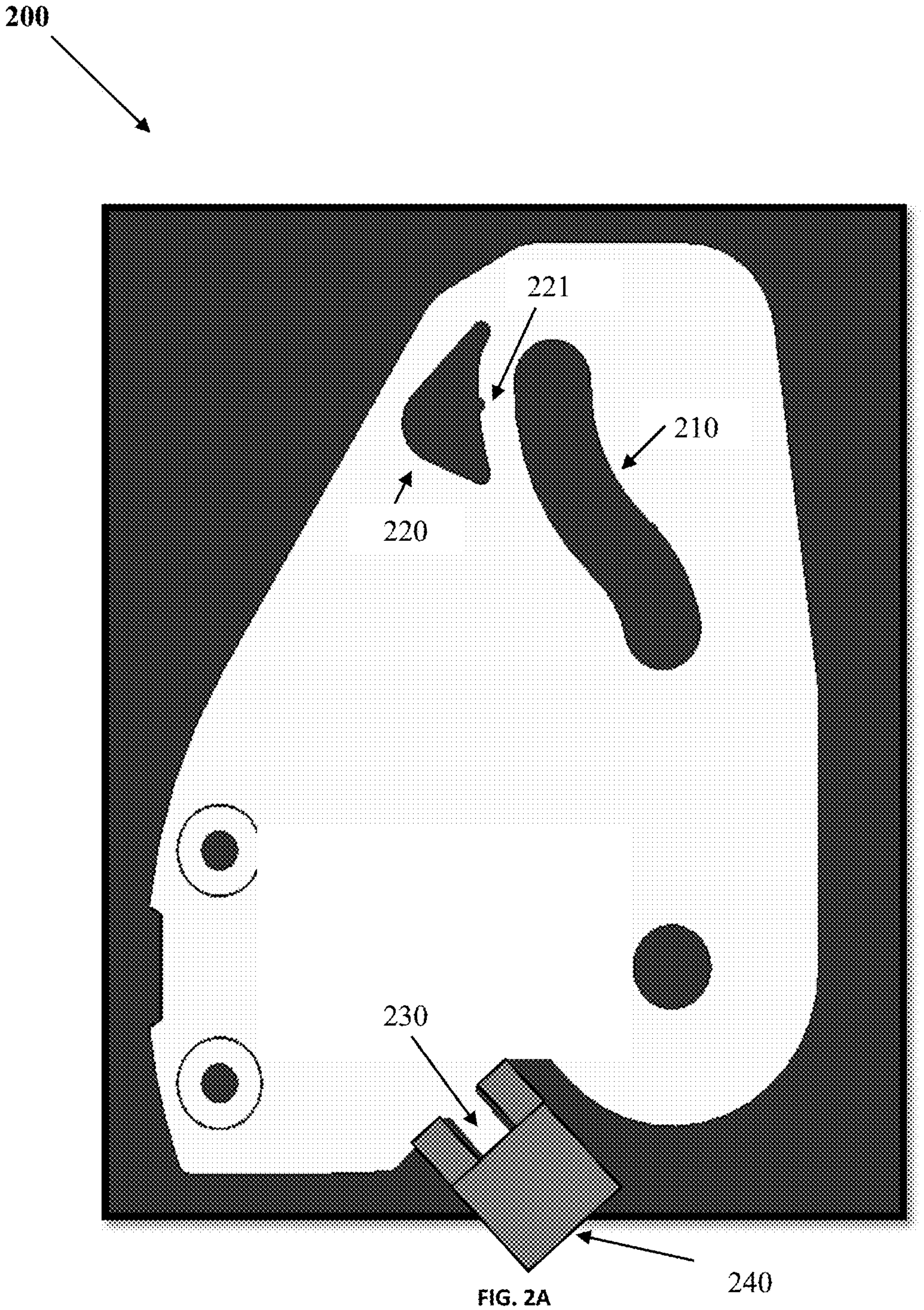
FIG. 2A is a diagram of a side flange with a broken blade detection sensor for a shutter assembly, according to an example embodiment.

FIG. 2A is a diagram of a side flange 200 with a broken blade detection sensor 240 for a shutter assembly 300 (shown and discussed with FIG. 3 below), according to an example embodiment. The side flange 200 is a single piece of manufactured material, such as a plastic molding. A U-shaped optical sensor 240 is added to shutter apparatus 300.

The shutter apparatus 300 includes an S-shaped and first aperture 210 designed to allow a pin of the shutter apparatus 300 to move through the aperture 210 when the blade of the shutter apparatus 300 is opened on instruction from the media handling device or transaction terminal during a media operation. The shutter apparatus 300 also includes a second aperture 220 that is adjacent to both a side edge of the side flange 200 and adjacent to a top portion of the S-Shaped first aperture 210. The second aperture 220 includes a notch 221 situated on an edge of the second aperture 220 in a substantial center of the edge and adjacent to a top-portion of the S-Shaped aperture 210.

In an embodiment, the thickness of the second aperture 220 is approximately 3 millimeters (mm). The notch 221 has approximately 1 mm diameter extending out from the edge of the second aperture 220. The thickness of second aperture 220, diameter of notch 221, and the shape/geometry and placement of both the second aperture 220 with notch 221 is tuned to fail (i.e., rupture or break side flange 220) at an approximate force of 900N (newtons). Force exerted on a blade of the shutter assembly transfers at least 900N to the side flange 200, such that any thief attempting to break the blade will be detected.

Side flange 200 also includes a second manufactured protruding or extending notch 230 located at a bottom of side flange 200. The notch 230 is rectangular in shape. A U-shaped optical sensor 240 includes two extending arms from a base, the notch 230 is adapted to fit inside the two extending arms and abut the base. Any side to side or up a down movement in the notch 230 will cause the optical sensor 240 to report a not-closed state for the blade by indicating that the pin ruptured from the first S-shaped aperture 210 into the second aperture 220 at the notch 221 location.

Figure 2B:
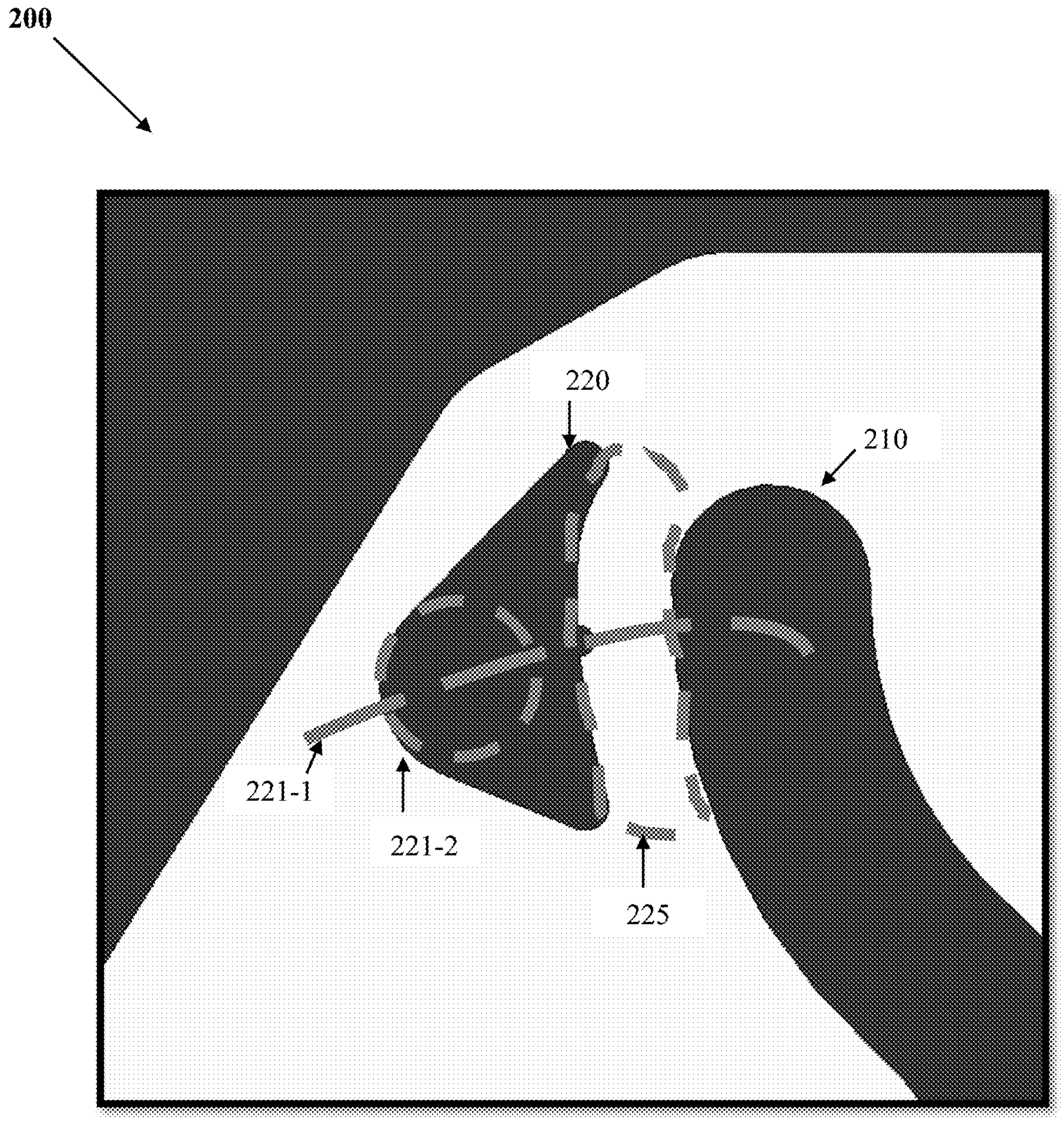
FIG. 2B is a diagram of apertures and shapes between the apertures of the side flange of FIG. 2A, according to an example embodiment.

FIG. 2B is a diagram of apertures 210 and 220 and shapes/geometries between the apertures 210 and 220 of the side flange 220 of FIG. 2A, according to an example embodiment. The broken lines 221-1, 221-2, and 225 are intended to illustrate the areas that are weakened and cause the pin to burst or rupture from the first aperture 210 through a non-aperture area of the side flange 200 and into a final resting place 221-2 within the second aperture 220. The side flange 200 takes a path of least resistance 221-1 when force is transferred from the blade to the side flange 200 causing the side flange 200 to move across from the first U-Shaped aperture 210 through non-aperture area 225 and rest the pin within the second aperture 220 at location 221-2. Notice that the slide flange 200 moves downward in addition to sideways, this backward and downward movement causes side flange 200 to raise up a small amount moving notch 230 to one arm of U-shaped sensor 240 and off the base of sensor 240 a small amount, which is then reported as a non-closed state by sensor 240. The pin itself remains locked and stationary when a blade attack is occurring because the media handling device or transaction terminal believes the blade is locked.

Figure 3:
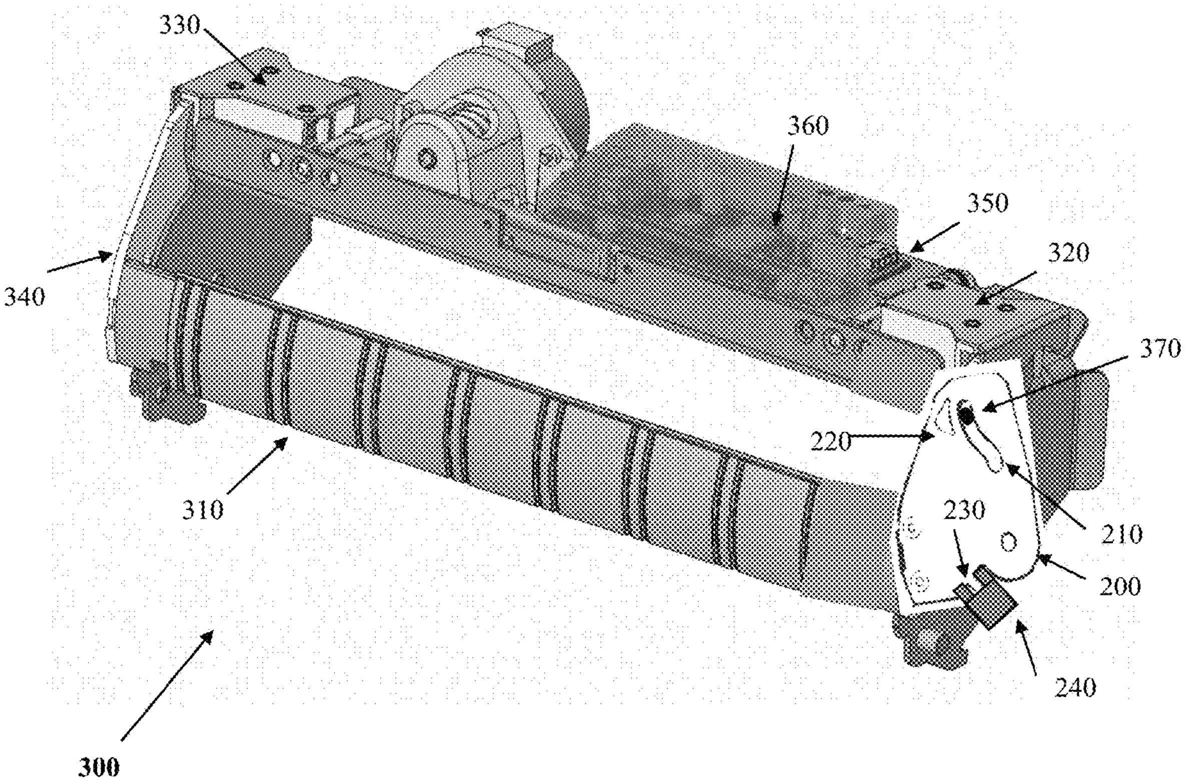
FIG. 3 is a diagram of a shutter assembly with the side flange and broken blade detection sensor, according to an example embodiment.

FIG. 3 is a diagram of a shutter apparatus 300 with the side flange 200 and broken blade detection sensor 240, according to an example embodiment. The shutter apparatus 300 includes a blade 310, a blade closed state sensor 320, a blade open state sensor 330, the left-side flange 200 as discussed above in FIGS. 2A and 2B along with broken blade detection sensor 240, a right-side flange 340, a sensor port 350, and a PCB 360.

The left-side flange 200 is affixed to a first end of blade 310 while the right-side flange 340 is affixed to a second and opposing end of blade 320. Pin 370 is inserted into the first U-shaped aperture 210. As the pin 370 is driven downward within first aperture 210, the left-side flange 200 moves upward and backward, which lifts blade 310. This movement causes closed state sensor 320 to report through cabling connected to sensor port 350 a not closed or non-closed state for blade 310 to PCB 360. This occurs when the media handling device opens the blade 310 during a media operation and thus unlocks the pin 370.

However, when blade 310 is busted in a blade breaking security breach there is little or no downward movement of pin 370 since the pin 370 is locked into placed for a closed state. This is no longer the case with shutter apparatus 300, because pin 370 ruptures into second aperture 220 when force is transferred from blade 310 to left-side flange 220 causing enough backward and downward movement in side-flange 220 to move notch 230 to one side of the U-shaped optical sensor 240.

In an embodiment, the output produced from U-Shaped sensor 240 is integrated or added to the output produced from closed state sensor 320 within the cabling output from sensor 320. The combined output is an OR condition such that when either the closed state sensor 320 reports a not closed state or the U-shaped sensor reports a blade broken state, the sensor output from both sensors 320 and 240 is reported to PCB 360 through port 350. Thus, no changes are needed nor are any modifications needed to any security firmware or software on the PCB 360 of the shutter assembly 300 or on downstream processors on the media handling device or transaction terminal to address a broken blade 310 security breach. A security breach will automatically be detected by the PCB firmware and downstream software when the media handling device or transaction terminal expects the blade 310 to be in a closed and locked state and receives a not closed state as a result of a broken blade 310 attack because U-shaped sensor 240 will detect, report, and raise a not closed event or state through port 350 to PCB 360, which in turn will report the event or state to the downstream security software of the media handling device or transaction terminal.

Figure 4:
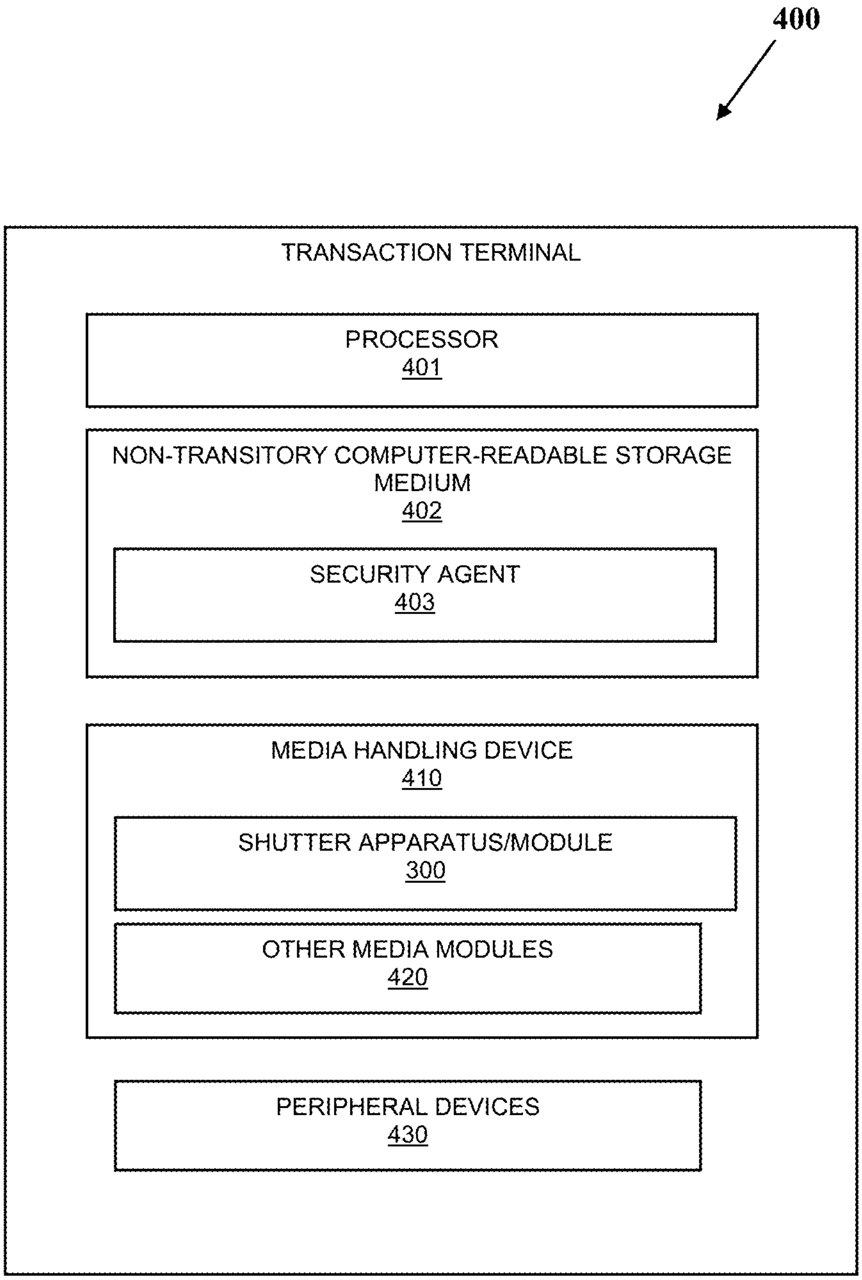
FIG. 4 is a diagram of a transaction terminal with a media handling device that includes the shutter assembly, according to an example embodiment.

FIG. 4 is a diagram of a transaction terminal 400 with a media handling device 410 that includes the shutter apparatus 300, according to an example embodiment. The components or modules of the terminal 400 are shown in simplified form with only those components necessary for understanding the teachings presented. Notably, terminal 400 can include more or less components from that which is illustrated without departing from the teachings provided herein.

Transaction terminal 400 includes a processor 402; a non-transitory computer-readable storage medium, which includes instructions for a security agent 403; a media handling device 410, and peripheral devices 430. The instructions when executed by processor 401 cause processor 401 to perform operations discussed herein with respect to security agent 403.

Media handling device 410 is an integrated peripheral device of terminal 400. Media handling device 410 includes shutter apparatus/module 300 and other media handling modules 420. For example, the other media handling modules 420 can include, by way of example only, an upper media transport module, a media deskew module, a media verification module, a media diverter module, a lower media transport module, an escrow module, a recycler module, media cassettes modules, etc.

The peripheral devices 430 include, by way of example only, a card reader peripheral, a print receipt peripheral, a touchscreen peripheral, a contactless card reader peripheral (e.g., a near field communication (NFC) transceiver), a bioptic scanner peripheral, a handheld scanner peripheral, a vertical scanner peripheral, a horizontal scanner peripheral, a weigh scale peripheral, a bag scale peripheral, a combined scanner and scale peripheral, one or more camera peripherals, etc. Again, the media handling device 410 is also an integrated peripheral of terminal 400.

Media handling device 410 includes the shutter apparatus 300 discussed above with FIGS. 2A, 2B, and 3. The shutter apparatus 300 includes a first S-shaped aperture 210 adapted to hold a pin 370 that urges a side flange 200 to move upward and backward when a blade 310 of the shutter apparatus 300 is opened to dispense media for a media dispense operation or is opened to receive media for a media deposit operation. The side flange 200 is affixed security to an end of the blade 310 such that when pin 370 is urged through the S-shaped aperture 210, the blade 310 opens to reveal an internal media slot from which media is dispensed or deposited.

The side flange 200 also includes a specialized shape and located second aperture 220 adapted based on its geometry and location relative to an edge of the side flange 200 and the S-shaped aperture to rupture and move side flange 200 backward and slightly upward when force is applied to blade 310 and when the pin 370 is locked during a locked shutter state of apparatus 300. The side flange 200 also includes a bottom extending or protruding notch 230 surrounds on three sides by a U-shaped optical sensor 240. Any movement in notch 230 is detected by sensor 240 and a signal corresponding to a blade not closed state/event is raised through cabling through port 350 to firmware on PCB 360. PCB 360 raises the event where it is detected by security agent 403.

When security agent 403 is expecting a blade closed state such as when transaction terminal 400 is idle or when a current state of a transaction at terminal 400 does not correspond to an opening of blade 310 and security agent 403 has received a blade not closed event/state raised by PCB 360, security agent 403 processes a workflow of security operations. For example, the workflow includes forcing a shutdown of media handling device 410, which in turn disables shutter apparatus 300 and cancels any current media operation being processed on the media handling device 420; forcing a shutdown of terminal 400; activating a camera peripheral device 430 to capture video of an area adjacent to the terminal 400; streaming the video to computer vision applications or systems for analysis; dispatching a service engineer to the transaction terminal; etc.

In an embodiment, notch 230 can be of any shape and optical sensor 240 is of a compatible shape to that which is associated with notch 230. In an embodiment, firmware on PCB 360 is updated to receive a broken blade state/event directly from sensor 240. In an embodiment, security agent 403 processes a customized workflow for a broken blade state/event raised from sensor 240 via PCB 360.

Figure 5:
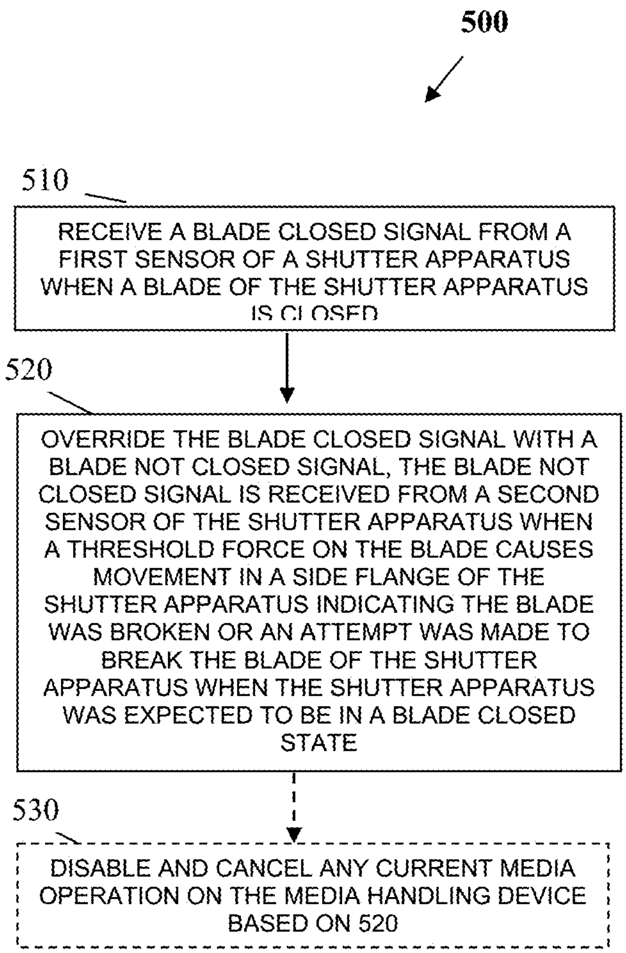
FIG. 5 is a diagram of a method for detecting a broken blade of a shutter assembly for a transaction terminal, according to an example embodiment.

FIG. 5 is a diagram of a method 500 for detecting a broken blade of a shutter assembly for a media handling device, according to an example embodiment. The software module(s) that implements the method 300 is referred to as "firmware." The firmware is implemented as executable instructions programmed and residing within memory and/or a non-transitory computer-readable (processor-readable) storage medium and executed by one or more processors of one or more devices. The processor(s) of the device(s) that executes the firmware are specifically configured and programmed to process the firmware. The firmware may or may not have access to one or more network connections during its processing. Any network connections used are wired, wireless, or a combination of wired and wireless.

In an embodiment, the device that executes the firmware is PCB 360 of shutter apparatus 300. In an embodiment, the device that executes the firmware is media handling device 410. In an embodiment, the devices that executes the firmware is transaction terminal 400. In an embodiment, the firmware is a combination of both firmware and software executed by any combination of or by each of PCB 360, media handling device 410, and/or transaction terminal 400.

At 510, the firmware receives a blade closed signal from a first sensor 320 of a shutter apparatus when a blade 310 of the shutter apparatus 300 is closed. That is, the first sensor 320 does not detect any movement in pin 370 and thus regardless as to whether a blade breaking or shattering attack is occurring the first sensor 320 still reports the blade 310 is closed, as discussed above.

At 520, the firmware overrides the blade closed signal with a blade not closed signal. The blade not closed signal is received from a second sensor 240 of the shutter apparatus 300 when a threshold force on the blade 310 causes movement in a side flange 200 of the shutter apparatus 300. This is an indication the blade 310 was broken or an attempt was made to break the blade 310 of the shutter apparatus 300 when the shutter apparatus 300 was expected to be in a blade closed state.

In an embodiment, at 530, the firmware disables and cancels any current media operation on the media handling device 420 based on 520. Thus, if a cash withdrawal operation was in progress and currency was staged behind the blade 310 awaiting for a customer to remove a card from a card reader peripheral 430 of the transaction terminal 400, the firmware moves the cash back into the media handling device 420 into the corresponding cash denomination cassettes and the media handling device 420 is disabled for any further media operations until a service engineer inspects the shutter apparatus 300 and/or the blade 310.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

The above description is illustrative, and not restrictive. Other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A shutter apparatus for a media handling device, comprising:
- a side flange attached to an end of a blade; and
- a sensor;
- wherein the side flange is adapted to open and close a media slot through movement of the blade during a media operation being processed on the media handling device;
- wherein the side flange further includes:
  - a first aperture adapted to receive a pin that moves the side flange and correspondingly the blade;
  - a second aperture adjacent to the first aperture adapted to rupture the pin from the first aperture into the second aperture when a force above a threshold is exerted on the blade; and
  - a bottom extending notch;
- wherein the sensor is adapted to surround a portion of the bottom extending notch and raise a signal of a blade not closed state when the bottom extending notch moves based on the pin rupturing from the first aperture into the second aperture.

2. The shutter apparatus of claim 1, wherein the second aperture further includes a second notch extending towards the first aperture and the pin.

3. The shutter apparatus of claim 1, wherein the bottom extending notch is rectangular in shape.

4. The shutter apparatus of claim 3, wherein the sensor is a U-shaped optical sensor adapted to surround three sides of the bottom extending notch.

5. The shutter apparatus of claim 1, wherein the first aperture is an S-shaped aperture.

6. The shutter apparatus of claim 1 further comprising:
- a blade closed sensor adapted to raise a second signal for a blade closed state to a printed circuit board (PCB) of the shutter apparatus when the pin is locked and correspondingly the blade is closed.

7. The shutter apparatus of claim 6 further comprising, a blade closed sensor port of the PCB adapted to receive the second signal via a first cable from the blade closed sensor.

8. The shutter apparatus of claim 7 further comprising, a second cable adapted to integrate the signal from the sensor into the first cable with the second signal before being provided over the blade closed sensor port to the PCB from the blade closed sensor.

9. The shutter apparatus of claim 8, wherein firmware of the PCB is existing firmware adapted to receive the second signal via the first cable, wherein the existing firmware is not modified and receives and processes the signal when received over the first cable as the second signal received from the blade closed sensor.

10. The shutter apparatus of claim 9, wherein the firmware is adapted to raise a security alert to a security agent of a transaction terminal associated with the media handling device when the second signal indicates the blade closed state, but the signal indicates the blade not closed state.

* * * * *